United States Patent Office 3,193,520
Patented July 6, 1965

3,193,520
POLYMERIC COMPOSITIONS STABILIZED AGAINST HEAT, AGING AND LIGHT WITH SACCHARINE DERIVATIVES
Cornelio Caldo, Terni, Italy, assignor to Montecatini Società Generale per l'Industria Mineraria e Chimica, a corporation of Italy
No Drawing. Filed July 31, 1961, Ser. No. 127,850
Claims priority, application Italy, Aug. 2, 1960, 13,836/60
5 Claims. (Cl. 260—45.8)

The present invention relates to stabilized polymeric compositions of crystalline poly-alpha-olefins and to a process for stabilizing fibers, films and other manufactured articles made from such crystalline olefin polymers, particularly polypropylene.

It is known that polyolefin materials undergo a certain degradation during hot working, particularly in the presence of atmospheric oxygen. It is also known that articles manufactured from crystalline polyolefins are sensitive to the action of light and to thermal treatment.

This degradative action can be reduced by the addition of various specified protective substances to the polymer, generally during the preparation of fibers, films, etc. For this purpose small proportions of such compounds as amines, aminophenols, chelates of transition metals e.g., organo-tin compounds, triazole compounds, zinc compounds, dithiocarbamates, phenols, phosphites, mercaptans, oximes, polyquinolines, sulfur derivatives, etc., have been used.

An object of this invention is to provide novel stabilized compositions comprising a crystalline poly-alpha-olefin.

Another object is to provide novel methods for obtaining such stabilized compositions.

Additional objects will become apparent hereinafter.

We have now surprisingly found that $\alpha,\beta$-benzoisothiazolone-1-dioxide saccharine and certain nitrogen-substituted derivatives thereof exert a high stabilizing action against the action of heat and, in several instances against aging and of the action of light when mixed with the crystalline olefin polymer in an amount up to 2% of the weight of the polyolefin.

These compounds also act as stabilizers for compositions comprising crystalline polyolefins and basic nitrogen compounds such as those formed from polypropylene and polyalkyleneimine disclosed in U.S. patent application, Serial No. 702,430, filed on December 12, 1957, now Patent No. 3,107,228, which compositions produce textile fibers having improved tinctorial characteristics.

In accordance with the present invention polymeric compositions are obtained which are stable against the action of heat, aging and light, which compositions comprise a crystalline polyolefin and an organic stabilizer comprising $\alpha,\beta$-benzoisothiazolone-1-dioxide (saccharine)

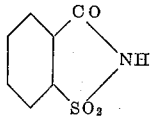

or its N-substituted alkyl, aryl, alkaryl, or ketonyl derivatives in an amount from about 0.02 to 2% by weight of the overall composition. The present invention also contemplates a process for stabilizing crystalline polyolefins, e.g., polypropylene, against the action of heat, aging and light, comprising adding to the polyolefin composition in an amount from about 0.02% and 2% by weight (preferably 0.2%) of the polyolefin of $\alpha,\beta$-benzoisothiazolone-1-dioxide (saccharine) or its nitrogen-substituted derivatives such as e.g., N-methylsaccharine, N-ethylsaccharine, N-phenylsaccharine and N-acetonylsaccharine.

The application of the stabilizing compounds of my invention is generally carried out by mixing such compounds with the poly-alpha-olefin, e.g., polypropylene while agitating.

Of course, the stabilizers can also be added by other methods such as e.g., by mixing the polyolefin with a solution of the stabilizer in a suitable solvent and then evaporating off the solvent; by adding the stabilizer to the polyolefin at the end of the polymerization; etc.

It is also possible to obtain the benefits of the stabilizing action by applying the stabilizing compounds directly onto the manufactured article, e.g., by immersing the article in a stabilizer solution or dispersion and then evaporating off the solvent or dispersing vehicle.

The stabilizing compounds of the present invention exhibit a good compatibility with molten polyolefins and have no staining action thereon.

The stabilized compositions of the present invention are particularly suitable for preparing monofilaments, plurifilaments, staple, dyeable yarns, bulk yarns, films, tapes, shaped articles and the like.

The addition to the composition, prior to the spinning thereof, of an inorganic salt of stearic acid e.g., calcium stearate, which salt functions of an antacid, improves the stability characteristics of the composition.

The following examples will further illustrate the present invention without limiting its scope. All parts are by weight unless otherwise stated. The polypropylene used in these examples consists prevailingly of isotactic macromolecules as defined by Natta, e.g., U.S. Patent 2,882,263.

*Example 1*

In a Werner type mixer a homogeneous mixture is prepared at room temperature from 9.98 kg. of polypropylene (prepared with the aid of stereospecific catalysts and having an intrinsic viscosity $[\eta]$, determined in tetrahydronaphthalene at 135° C., of 1.34, a residue from heptane extraction of 93.4%, and an ash content of 0.028%) and 20 g. of $\alpha,\beta$-benzoisothiazolone-1-dioxide.

The polymer stabilizer mix, when subjected to melting in a test tube kept in a thermostatic bath at 250° C. for 10 minutes, produces a virtually colorless molten mass.

The mix is spun in a melt spinning device under the following conditions:

Screw temperature _____ 200° C.
Head temperature _____ 200° C.
Spinneret temperature _____ 230° C.
Spinneret type _____ 60/0.8 x 16 mm.
Maximum pressure _____ 45 kg./cm.²
Winding speed _____ 300 meters min.

The fibers are stretched with a stretching ratio of 1 to 5.3 at 130° C. The serimetric characteristics of the fibers obtained are as follows:

Tenacity _____g./den__ 4.36
Elongation _____percent__ 26.2

In the transition from polymer to fiber, the intrinsic viscosity is lowered to 77% of the initial value, whereas the intrinsic viscosity of a fiber obtained from the same polymer without addition of stabilizer is lowered to 74.5% of the initial value.

The stabilized yarn, when exposed for 15 hours to the action of heat in an oven provided with air circulation at 120° C. (accelerated thermal aging test) remains practically unaltered in its characteristics.

After exposure to an ultra-violet mercury lamp for 20 hours the stabilized yarn maintains 37% of the initial tenacity, while with the non-stabilized yarn control the tenacity is reduced to only 32% of its initial value.

Example 2

In a Werner-type mixer a homogeneous mixture is prepared at room temperature from 9.95 kg. of polypropylene (prepared with stereospecific catalysts and having an intrinsic viscosity of 1.34 as determined in tetrahydronaphthalene at 135° C., a residue after heptane extraction of 94.3% and an ash content of 0.028%) and 50 g. of α,β-benzoisothiazolone-1-dioxide.

The polymer-stabilizer mix, when subjected to melting in a test tube kept in a thermostatic bath at 250° C. for 10 minutes, produces an almost colorless molten mass.

The mix is spun in a melt spinning device under the following conditions:

| | |
|---|---|
| Screw temperature | 220° C. |
| Head temperature | 220° C. |
| Spinneret temperature | 230° C. |
| Spinneret type | 60/0.8 x 16 mm. |
| Maximum pressure | 40 kg./cm.$^2$. |
| Winding speed | 300 meters/min. |

The fibers are stretched with a stretching ratio of 1 to 5.3 at 130° C. The serimetrical characteristics of the yarn obtained are:

| | |
|---|---|
| Tenacity _____g./den__ | 4.36 |
| Elongation _____percent__ | 26.2 |

In the transition from polymer to fiber, the intrinsic viscosity is lowered to 81% of its initial value, whereas the intrinsic viscosity of a fiber obtained from the same polymer without addition of stabilizer is lowered to 74.5% of its initial value.

The stabilized yarn when exposed for 15 hours to the action of heat in an oven provided with air circulation at 120° C. (accelerated thermal aging test), remains almost unaltered in its characteristics.

After exposure to an ultra-violet mercury lamp for 20 hours the stabilized yarn maintains 40% of its initial tenacity, whereas the tenacity of the non-stabilized yarn control is reduced to 32% of its initial value.

Example 3

In a Werner type mixer a homogeneous mix is prepared at room temperature from 9.90 kg. of polypropylene (prepared with the aid of stereospecific catalysts and having in intrinsic viscosity of 1.34 determined in tetrahydronaphthalene at 135° C., a residue from heptane extraction of 94.3%, and an ash content of 0.028%) and 100 g. of α,β-benzoisothiazolone-1-dioxide.

The polymer-stabilizer mix, when subjected to melting in a test tube kept in a thermostatic bath at 250° C. for 10 minutes produces an almost colorless molten mass.

The mix is spun in a melt spinning device under the following conditions:

| | |
|---|---|
| Screw temperature | 220° C. |
| Head temperature | 220° C. |
| Spinneret temperature | 230° C. |
| Spinneret type | 60/0.8 x 16 mm. |
| Maximum pressure | 40 kg./cm.$^2$. |
| Winding speed | 300 meters/min. |

The fiber is stretched with a stretching ratio of 1 to 5.3 at 130° C. The serimetrical characteristics of the fiber obtained are:

| | |
|---|---|
| Tenacity _____g./den__ | 4.02 |
| Elongation _____percent__ | 23.5 |

In the transition from polymer to fiber, the intrinsic viscosity is lowered to 78.5% of its initial value, whereas the intrinsic viscosity of a fiber obtained from the same polymer without addition of stabilizer is lowered to 74.5% of its initial value.

The stabilized yarn, when exposed for 15 hours to the action of heat in an oven provided with air circulation at 120° C. (accelerated thermal aging test), remains almost unaltered in its characteristics.

After exposure to an ultra-violet mercury lamp for 20 hours the stabilized yarn maintains 44% of its initial tenacity, whereas the tenacity of the non-stabilized yarn control is reduced to 32% of its initial value.

Variations can of course be made without departing from the spirit of my invention.

Having thus described my invention, what I desire to secure and hereby claim is:

1. A polymeric composition stabilized against heat, aging and light, comprising a crystalline polypropylene consisting prevailingly of isotactic macromolecules and a stabilizing amount of an organic stabilizer selected from the group consisting of α,β-benzoisothiazolone-1-dioxide, N-alkyl-α,β-benzoisothiazolone-1-dioxide, N-aryl-α,β-benzoisothiazolone-1-dioxide, N-alkaryl-α,β-benzoisothiazolone-1-dioxide, and N-ketonyl-α,β-benzoisothiazolone-1-dioxide.

2. The polymeric composition of claim 1, wherein the amount of stabilizing organic compound is from about 0.02 to 2% by weight of the polypropylene.

3. The polymeric composition of claim 1, wherein the amount of stabilizing organic compound is from about 0.2 to 1% by weight of the polypropylene.

4. The product of claim 1 in film form.

5. The product of claim 1 in fiber form.

References Cited by the Examiner

UNITED STATES PATENTS 2,985,617   5/61   Salyer et al. _____ 260—45.95

LEON J. BERCOVITZ, *Primary Examiner.*

MILTON STERMAN, *Examiner.*